(12) United States Patent
Whittle

(10) Patent No.: US 8,775,629 B1
(45) Date of Patent: Jul. 8, 2014

(54) SYSTEM AND METHOD FOR MANAGING INTERNET PROTOCOL (IP) ADDRESS SPACE FOR ENTERPRISE NETWORK

(75) Inventor: Steven Whittle, Redwood City, CA (US)

(73) Assignee: Infoblox Inc., Santa Clara, CA (US)

( * ) Notice: Subject to any disclaimer, the term of this patent is extended or adjusted under 35 U.S.C. 154(b) by 249 days.

(21) Appl. No.: 13/335,684

(22) Filed: Dec. 22, 2011

(51) Int. Cl.
G06F 15/173 (2006.01)

(52) U.S. Cl.
USPC .......................... 709/226; 709/223; 709/245

(58) Field of Classification Search
USPC .................................. 709/223–226, 245–246
See application file for complete search history.

(56) References Cited

U.S. PATENT DOCUMENTS

| 7,623,547 | B2  |   | 11/2009 | Dooley et al. |         |
|-----------|-----|---|---------|---------------|---------|
| 8,230,071 | B1  | * | 7/2012  | Quilter et al. ................. | 709/226 |
| 2002/0124066 | A1 | * | 9/2002  | Chang et al. .................. | 709/245 |
| 2003/0182448 | A1 | * | 9/2003  | Gooch et al. .................. | 709/245 |
| 2004/0177136 | A1 | * | 9/2004  | Chen et al. .................... | 709/223 |
| 2007/0282983 | A1 | * | 12/2007 | Gujarathi et al. ............. | 709/223 |
| 2008/0244054 | A1 | * | 10/2008 | Schomp ........................ | 709/223 |

* cited by examiner

Primary Examiner — Bharat N Barot
(74) Attorney, Agent, or Firm — Van Pelt, Yi & James LLP

(57) ABSTRACT

Techniques for graphically organizing networks by multiple criteria for IP address management network migration are provided. In some embodiments, various techniques for an IPAM device for graphically organizing networks by multiple criteria for IP address management network migration are disclosed. In some embodiments, system, method, and/or computer program product for managing an Internet Protocol (IP) address space for an enterprise network, includes determining a first set of networks associated with a first attribute; and allocating new network addresses for assigning to each of the first set of networks, wherein the new network addresses are allocated based on a contiguous network address allocation criteria.

16 Claims, 13 Drawing Sheets

IPv4 to IPv6 Network Mappings

Attribute: Location

| Group | IPv4 Network | IPv6 GRP | IPv6 Subnet | IPAM | Device | Status | Log |
|---|---|---|---|---|---|---|---|
| Boston | 10.34.56.0/24 | 2001:db80:1111 | 4000:2002/64 | ☑ | ☑ | Complete | View |
| Boston | 10.34.60.0/24 | 2001:db80:1111 | 4000:2004/64 | ☐ | ☐ | In Progress | View |
| Boston | 192.168.2.0/24 | 2001:db80:1111 | 4000:2006/64 | ☐ | ☐ | Not Started | View |
| NY | 10.78.45.0/25 | 2001:db80:1111 | 4000:4002/64 | ☐ | ☐ | Not Started | View |
| NY | 10.80.45.2/30 | 2001:db80:1111 | 4000:4004/64 | ☐ | ☐ | Not Started | View |

FIG. 9

SYSTEM AND METHOD FOR MANAGING INTERNET PROTOCOL (IP) ADDRESS SPACE FOR ENTERPRISE NETWORK

BACKGROUND OF THE INVENTION

Internet Protocol address management (IPAM) generally refers to the planning, tracking, and/or managing the Internet Protocol address space used in an Internet Protocol (IP) based network. IPAM tools generally include devices, such as software executed on computing systems such as servers or appliances, that perform IPAM related activities and/or tasks. In some cases, tools such as domain name server (DNS) tools and dynamic host control protocol (DHCP) tools are used in tandem to perform IPAM related tasks.

BRIEF DESCRIPTION OF THE DRAWINGS

Various embodiments of the invention are disclosed in the following detailed description and the accompanying drawings.

FIG. 9 illustrates another screen shot 902 of a graphical user interface (GUI) of an IPv6 transition wizard for graphically organizing networks by multiple criteria for IP address management network migration in accordance with some embodiments.

DETAILED DESCRIPTION

Figure 1A:
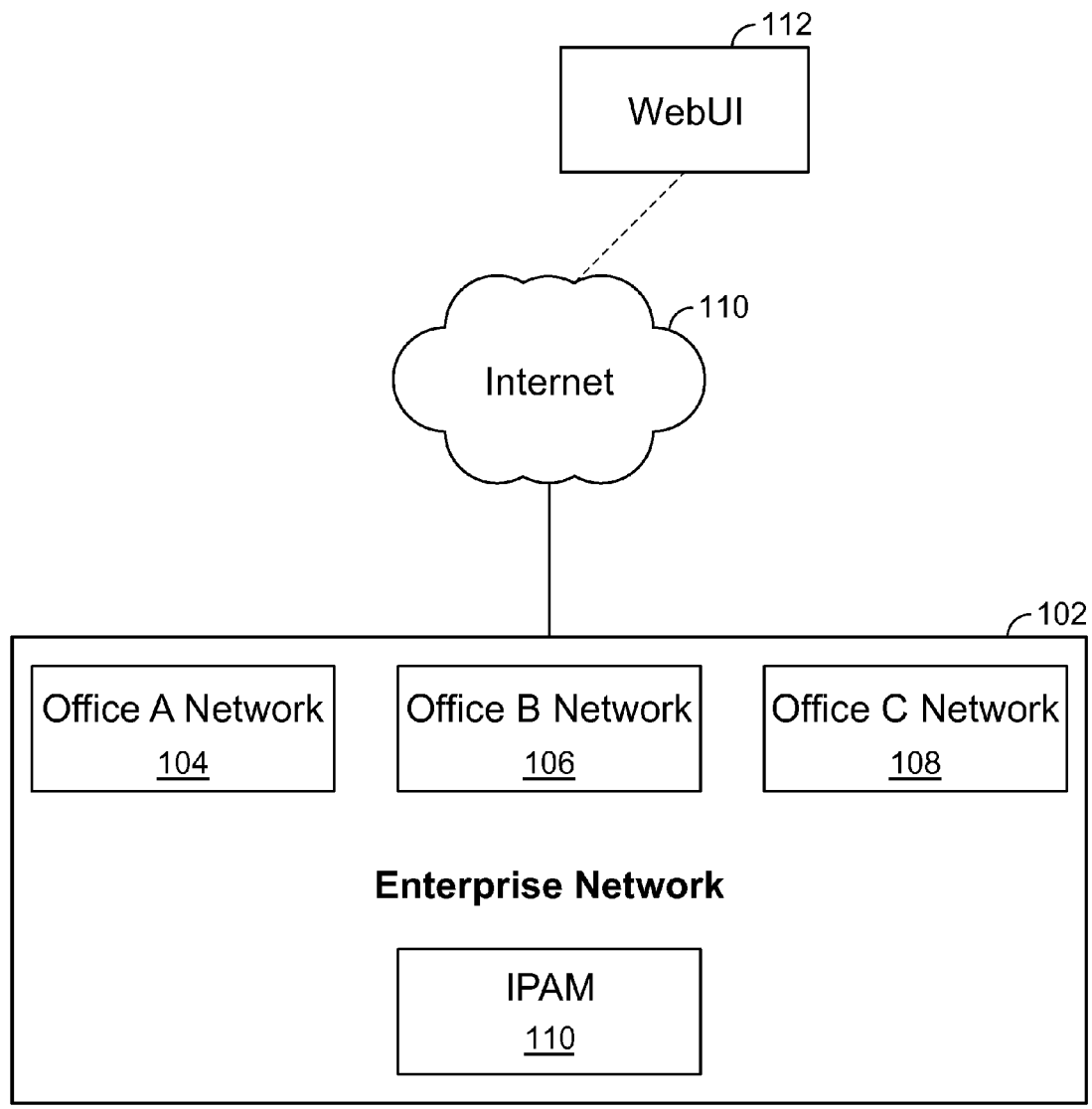
FIG. 1A illustrates a network architecture for associating text strings with numeric numbers for IP address management in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet Protocol address management (IPAM) generally refers to the planning, tracking, and/or managing the Internet Protocol address space used in an Internet Protocol (IP) based network. IPAM tools generally include devices, such as software executed on computing systems such as servers or appliances or virtual appliances, that perform IPAM related activities and/or tasks. In some cases, tools such as domain name server (DNS) tools and dynamic host control protocol (DHCP) tools are used in tandem to perform IPAM related tasks.

IPAM tools are increasingly important for effectively and efficiently managing IP based networks as, for example, new IPv6 networks are deployed with larger address pools, different subnetting techniques are employed, and more complex 128-bit hexadecimal numbers, which are not as easily human-readable as IPv4 addresses, are allocated. For example, IPv6 networking, mobile computing, and multi-homing generally require more dynamic address management and, as a result, are rendering impractical early generation techniques of IP address management (IPAM) software and spreadsheets that were typically used for IP address management.

IP address management allows organizations to manage their existing IP addresses. For example, many organizations are in the process of planning to migrate to IP version 6 (IPv6) to take advantage of larger address spaces and increased functionality. Various IP address management applications allow an organization to associate non network data with IP addresses and networks. This data can include any information associated with a network. This data can be manually populated or gathered by the IP address management system or external tools.

However, larger enterprises generally have larger IP address space(s) and are more commonly looking towards migrating to IPv6 network addressing. Larger enterprises also often have networks that can be geographically diverse (e.g., spanning across multiple floors or buildings within an office complex, multiple offices, multiple regions, and so forth). As a result, such entities may not have adequate visibility into their entire IP address space as their IP addressing can be very complicated, with a significant number of devices and networks.

For example, migrating to IPv6 can be a very complex, difficult, and time consuming task. If a network administrator is planning to transition to IPv6, then the network administrator would have to perform a series of manual steps. The network administrator would need to survey existing IPv4 networks to understand the network architecture. The network administrator would need to survey existing network devices to determine which support IPv6. The network administrator would then need to organize the existing networks based on some logic to group the existing networks. The network administrator would then need to determine IPv6 networks to map to IPv4 networks and manually divide the IPv6 network address space to build summarization. Finally, the network administrator would then need to write scripts to add the new IPv6 networks to the network devices or manually change devices one by one.

What are needed are new and improved techniques for graphically organizing networks by multiple criteria for IP address management network migration.

Accordingly, new and improved techniques for graphically organizing networks by multiple criteria for IP address management network migration (e.g., transition) are provided. In some embodiments, various techniques for an IPAM device for graphically organizing networks by multiple criteria for IP address management network migration are disclosed.

For example, using the various techniques described herein can facilitate and improve planning IPv6 addressing schemes. Moreover, migrating networks to IPv6 is a complex task. The address planning along with the requirement to completely understand the existing IPv4 network can make such migrations even more difficult. Thus, in some embodiments, the various techniques described herein allow an administrator to graphically organize (e.g., group) an existing IPv4 network by multiple criteria (e.g., location and/or other criteria) and to automatically assign IPv6 networks based on various criteria (e.g., including based on best practices, such as subnet size).

In some embodiments, a system, method, and/or computer program product for managing an Internet Protocol (IP) address space for an enterprise network, includes determining a first set of networks associated with a first attribute; and allocating new network addresses for assigning to each of the first set of networks, in which the new network addresses are allocated based on a contiguous network address allocation criteria.

In some embodiments, system, method, and/or computer program product for an Internet Protocol Address Management (IPAM) system for managing an Internet Protocol (IP) address space for an enterprise network, includes determining a first set of networks associated with a first attribute, in which the first attribute is associated with location information; and allocating new network addresses for assigning to each of the first set of networks, in which the new network addresses are selected based on a contiguous network address allocation within a selected subnet index, in which the first set of networks are Internet Protocol version 4 (IPv4) networks, and in which the new network addresses assigned to each of the first set of networks are Internet Protocol version 6 (IPv6) network addresses.

In some embodiments, the various techniques described herein allow an organization to sort and group networks based on various criteria (e.g., location and/or other criteria). For example, networks can be grouped by multiple criteria at the same time. Once this data has been sorted in a manner that is acceptable to the network administrator (e.g., or network manager), the appropriate IPv6 network(s) to associate with an IPv4 network can be automatically determined. The administrator can then manually modify (e.g., override, such as reconfigure or not accept) the generated results if desired.

In some embodiments, the new IPv6 network allocations are automatically determined based on various criteria. For example, the IPv6 network allocations can be based on generally accepted best practices, such as the following example best practices. Contiguous network address allocation is a generally accepted best practice to ensure a contiguous network address allocation within a selected subnet index. Standard network size is a generally accepted best practice to make all non-point-to-point IPv6 networks a size of /64. Summarization is a generally accepted best practice to ensure that all networks in a specific part of the network should be addressable by a single summary network to simplify and optimize routing. Spacing is a generally accepted best practice to ensure that there should be gaps in the allocation of new networks to allow for future growth of the network. In particular, these gaps should generally be based on powers of 2 to allow for further summarization of networks (e.g., every second network (or fourth or eighth, etc.) should be allocated initially, thereby allowing future expansion to use these gaps).

In some embodiments, the various techniques described herein allow a network administrator to do an analysis of their network to examine the network and determine which network devices on the examined network will support IPv6. For example, publicly available data sources can be used in order to analyze the devices on the examined network and determine which of the devices on the examined network are capable of supporting IPv6 and which of the devices on the examined network are not capable of supporting IPv6 (e.g., and such can be presented for output, such as in a report or graphical user interface (GUI) display or other output mechanism).

In some embodiments, once the IPv6 networks have been generated, the administrator can save the profile(s) for later use. For example, such profiles can be used to automatically register these IPv6 networks in an IP address management system and/or automate the provisioning of these networks on the appropriate network devices. By using such techniques for an automated IPv4 to IPv6 transition, the potential for errors is greatly reduced and the time to migrate existing networks and to implement new IPv6 networks is also significantly reduced.

For example, various techniques described herein facilitate an enhanced understanding and improved management of IPv6 networks, which are otherwise not as easily human-readable as IPv4 addresses. In particular, with the introduction of IPv6, it is generally very difficult for network managers/administrators to memorize addresses or understand the relationship between various different network addresses. This problem also generally applies to the host portion of a network address, which is usually the MAC address, as further described herein. Thus, various techniques described herein can also facilitate network managers' understanding by, for example, associating human/user friendly names for networks and host devices. As a result, the various technique described herein can be used to facilitate the management of networks as further described below with respect to various embodiments.

In some embodiments, various techniques for an IPAM device for associating text strings with numeric numbers for IP address management are disclosed. In some embodiments, system, method, and/or computer program product for an Internet Protocol Address Management (IPAM) system for managing an Internet Protocol (IP) address space for an enterprise network (e.g., of an enterprise), includes associating a text string with a substring of a network address; and storing the text string in association with the substring of the network address in the IPAM system for managing the IP address space.

In some embodiments, various techniques for an IPAM device for associating text strings with numeric numbers for IP address management using vendor based MAC address information are disclosed. In some embodiments, system, method, and/or computer program product for an Internet Protocol Address Management (IPAM) system for managing an Internet Protocol (IP) address space for an enterprise network (e.g., of an enterprise), includes associating a first name with a first substring of a network address of a host device; associating a second name with a second substring of the network address of the host device; associating a vendor name with a third substring of the network address of the host device, in which the vendor name is determined based on Media Access Control (MAC) address; and storing the first name, the second name, and the vendor name in association with the network address in the IPAM system for managing the IP address space.

FIG. 1A illustrates a network architecture for associating text strings with numeric numbers for IP address management in accordance with some embodiments. As shown, an enterprise network 102 includes various subnetworks for different offices, which as shown include Office A Network 104, Office B Network 106, and Office C Network 108 (e.g., which can be in different geographical locations). The enterprise network 102 also includes an Internet Protocol Address Management (IPAM) system 110 for managing an Internet Protocol (IP) address space for the enterprise network 102 of an enterprise (e.g., including managing the IP address space for the subnetworks 104, 106, and 108 and the various host devices on the enterprise network 102 including the subnetworks 104, 106, and 108). For example, various authorized users, such as authorized network administrators or network managers can access the IPAM system through a WebUI 112 (e.g., web based user interface, which provides a graphical user interface (GUI), and which can be accessed via various web browsers) via a network, such as the Internet 110 as shown.

In some embodiments, the network architecture as shown in FIG. 1A, or other similar network architectures as will now be apparent to one of ordinary skill in the art in view of the disclosed embodiments, can be used for management of IPv6 network numbers as described below. IPv6 networks generally include three primary components: a Global Routing Prefix (GRP), a Subnet ID, and an Interface ID. Each of these components is expressed in hexadecimal digits. In some embodiments, using various techniques for an IPAM device for associating text strings with numeric numbers for IP address management allows users (e.g., network administrators and/or network managers) of a management application (e.g., an IPAM device) to substitute user friendly names for one or more components of the IPv6 address. For example, a user can substitute the global routing prefix with the company name (e.g., COMPANY_NAME) and the Subnet ID with a location (e.g., BUILDING_NUMBER). In this example, an IPv6 network can be expressed as COMPANY_NAME: BUILDING_NUMBER/64.

For example, by substituting text strings, such as names, for the numbers of one or more components of the IPv6 address of a network or device, such network addresses can be more easily understood. This approach also can make troubleshooting easier for network issues, because a person is able to intuitively understand the relationships between such named networks/named network devices and the use, location, and/or function of such named networks/named network devices.

Figure 1B:
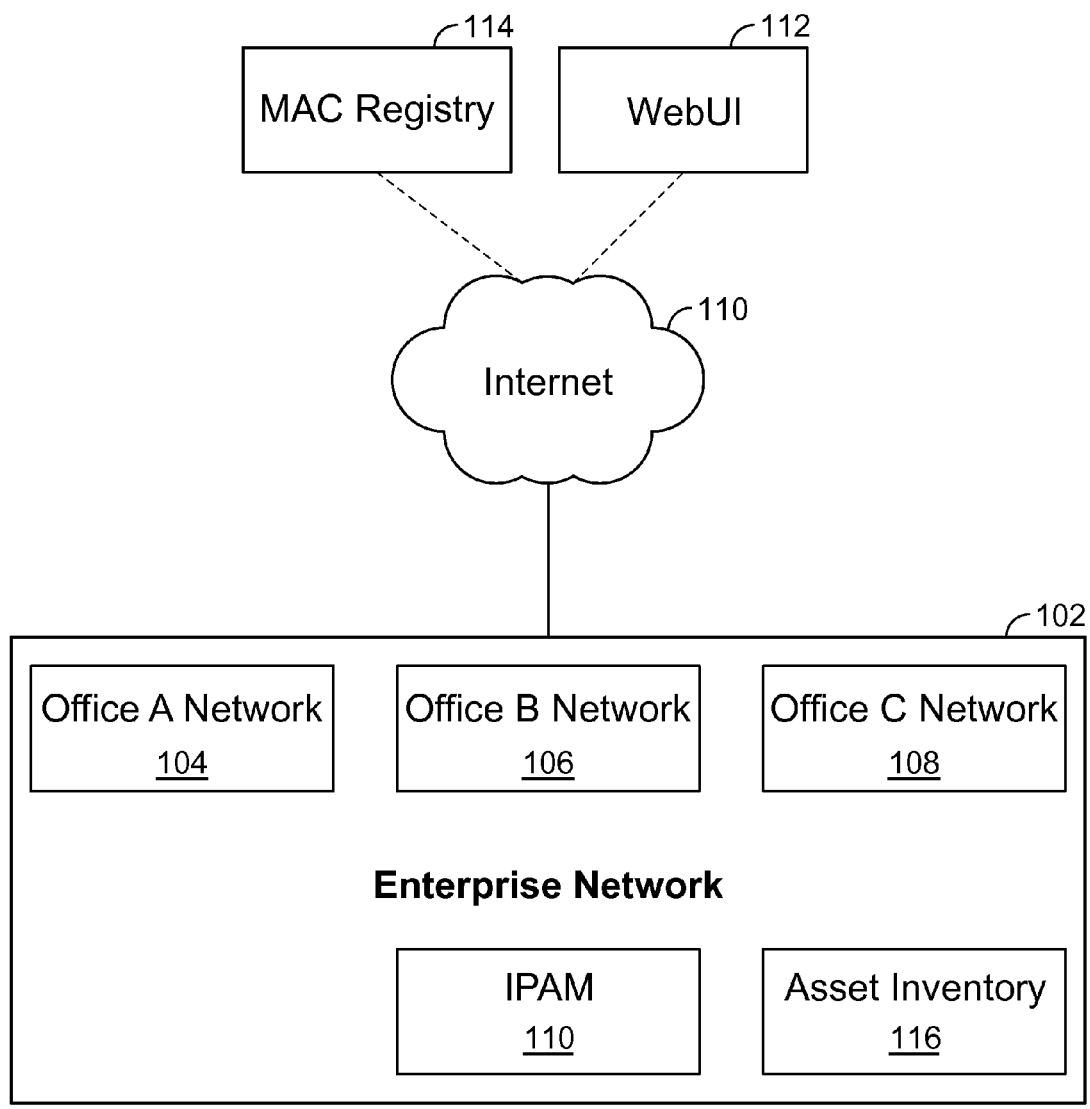
FIG. 1B illustrates a network architecture for associating text strings with numeric numbers for IP address management using vendor based MAC address information in accordance with some embodiments.

FIG. 1B illustrates a network architecture for associating text strings with numeric numbers for IP address management using vendor based MAC address information in accordance with some embodiments. As shown, the enterprise network 102 also includes an asset inventory 116 (e.g., an asset inventory data store, such as an asset inventory database or system). As also shown, the IPAM system 110 is in communication with a MAC registry 114 via the Internet 110.

In some embodiments, the network architecture as shown in FIG. 1B, or other similar network architectures as will now be apparent to one of ordinary skill in the art in view of the disclosed embodiments, can be used for management of IPv6 network numbers using vendor based MAC address information as described below. In IPv6 addressing, the host portion of a network typically includes the hardware address, which is typically based on a Media Access Control (MAC) address. IPv6 implements additional features not present in IPv4, which simplifies aspects of address assignment by providing for StateLess Address autoConfiguration (SLAC). Thus, the IPv6 subnet size has been standardized by fixing the size of the host identifier portion of an address to 64 bits to facilitate this automatic mechanism, referred to as SLAC, for forming the host identifier from link-layer media addressing information (e.g., MAC address). For example, a host identifier portion of an address that includes the hexadecimal digits FFFE in its middle quartet of the 64 bits (i.e., as the last two digits of the second block and the first two digits of the third block of the host portion of the IPv6 address) is typically a SLAC generated address. In other words, if an IPv6 address contains the MAC address of the client (e.g., host device), it will contain the hex digits FFFE as the last two digits of the second block and the first two digits of the third block of the host portion of the IPv6 address.

A MAC address also generally includes two separate components, a vendor ID and a unique identifier. The vendor ID generally is a unique number allocated to the manufacturer of the network card by the Institute of Electronics and Electrical Engineers (IEEE). The vendor ID is publicly available information. In some embodiments, a text string is provided to replace the vendor name (e.g., as shown in a UI for IP address management). For example, this approach can help network administrators more easily understand the types of devices that are on the network without needing to memorize or manually look up the vendor ID. For example, using this technique for vendor ID naming substitution for the MAC address (e.g., VENDOR_NAME) combined with the network naming technique discussed above, a network device can be displayed in a UI of an IPAM device as follows: COMPANY_NAME:BUILDING_NUMBER:VENDOR_NAME:0F:12de:74ac. Also, a unique device name can be associated with a remaining portion of the network address (e.g., USER_NAME_LAPTOP or HQ_FLOOR#_ PRINTER_NAME), or combined with the previous example, the following substituted host device name can be provided (e.g., for display/presentation on a GUI, such as WebUI 112/212) as COMPANY_NAME:BUILDING_ NUMBER:VENDOR_NAME: USER_NAME_LAPTOP or HQ_FLOOR#_ PRINTER_NAME.

In some embodiments, the MAC address is extracted from the IPv6 address of a host device, and this information is correlated with an asset inventory, such as asset inventory 116 as shown in FIG. 1B. For example, this information can be correlated with the asset information stored in the asset inventory 116 (e.g., which includes assets for the enterprise, including MAC address information for each asset) for security purposes (e.g., hosts whose MAC address is not in the asset database can be quarantined, that is, given limited or no access to network resources using various network access control techniques). The MAC address can also be used to retrieve other information from the asset database to populate data into an IP address management application (e.g., IPAM system 110).

Accordingly, as described herein, various techniques can be used to determine that an IPv6 address is a SLAC generated address, to extract the MAC address from the host portion of the SLAC generated address, and then to determine the manufacturer associated with the extracted MAC address. For example, a MAC vendor prefix lookup can be communicated over the Internet to a MAC registry 114 for the MAC vendor prefix lookup as shown in FIG. 1B.

In some embodiments, a system, method, and/or computer program product for the IPAM system 110 for managing the IP address space of the enterprise network 110 includes associating a first name with a first substring of a network address of a host device; associating a second name with a second substring of the network address of the host device; associating a vendor name with a third substring of the network address of the host device, in which the vendor name is determined based on a MAC address; and storing the first name, the second name, and the vendor name in association with the network address in the IPAM system 110 for managing the IP address space for the enterprise network 102. In some embodiments, the network address is an Internet Protocol version 6 (IPv6) network address generated using SLAC. In some embodiments, a MAC vendor prefix registry for SLAC address decoding is stored (e.g., in the MAC Registry 114, in the IPAM system 110, and/or another data store).

In some embodiments, the system, method, and/or computer program product for the IPAM system 110 for managing the IP address space of the enterprise network 110 further includes decoding the network address to determine that the network address is an IPv6 network address generated using SLAC; extracting the MAC address to determine the vendor name; communicating with a MAC registry over a network to perform a MAC address lookup; and determining the vendor name associated with the MAC address based on the MAC address lookup.

In some embodiments, the system, method, and/or computer program product for the IPAM system 110 for managing the IP address space of the enterprise network 110 further includes decoding the network address to determine that the network address is an IPv6 network address generated using SLAC; extracting the MAC address to determine the vendor name; communicating over a network with an asset inventory for the enterprise to perform an asset verification lookup for the host device based on the extracted MAC address; determining that the host device is not included in the asset inventory for the enterprise based on the asset verification lookup; and performing an action based on the determination that the device is not included in the asset inventory for the enterprise.

In some embodiments, the system, method, and/or computer program product for the IPAM system 110 for managing the IP address space of the enterprise network 110 further includes transmitting for presentation one or more active devices on a network of an enterprise; and displaying an indicator for each of the one or more active devices on the network of the enterprise that are determined to not be included in asset inventory for the enterprise.

In some embodiments, the system, method, and/or computer program product for the IPAM system 110 for managing the IP address space of the enterprise network 110 further includes associating a unique device name with a remaining portion of the network address (e.g., USER_NAME_LAPTOP or HQ_FLOOR#_PRINTER_NAME).

Figure 2:
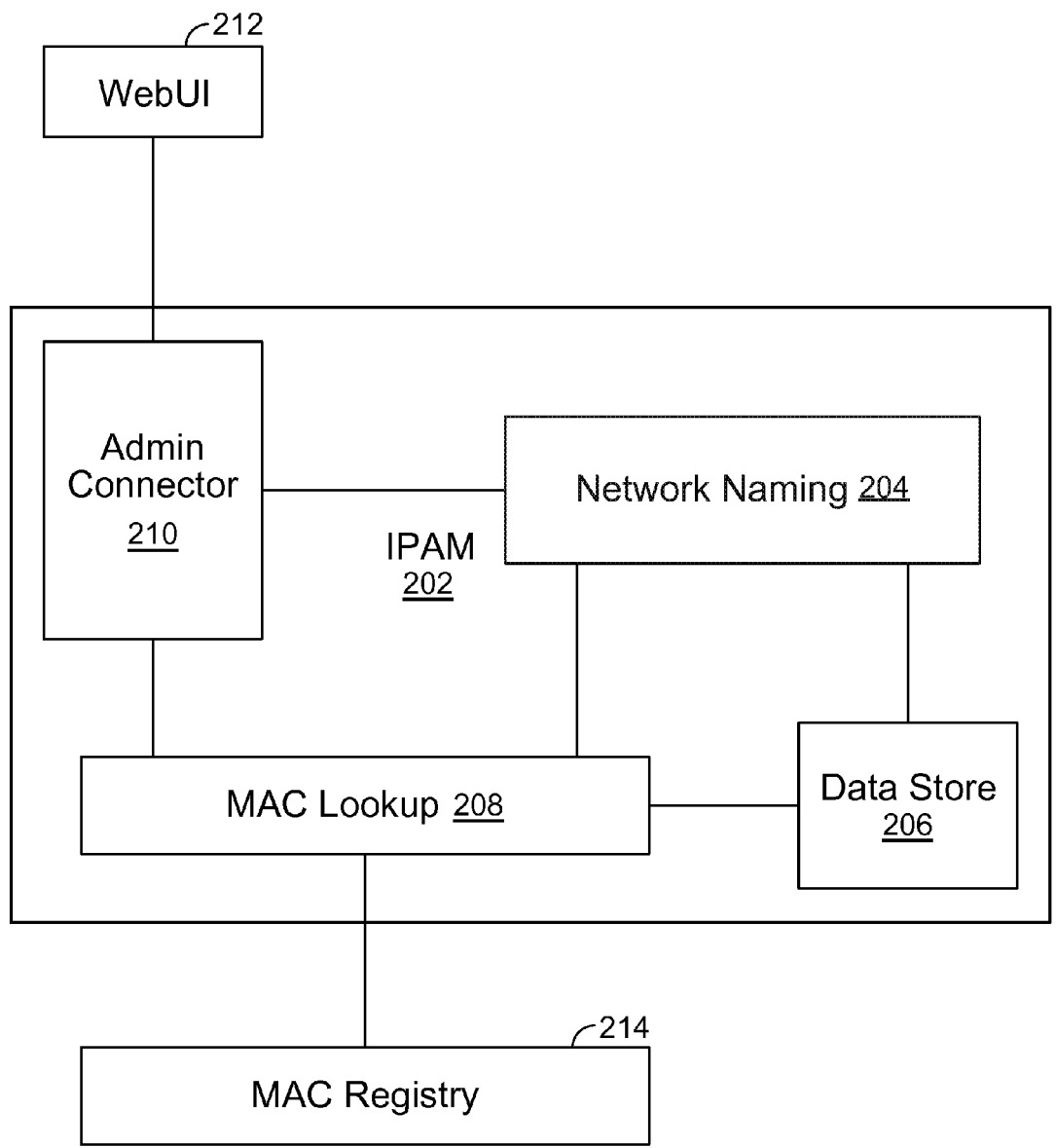
FIG. 2 illustrates a functional diagram of an IP Address Management (IPAM) device for associating text strings with numeric numbers for IP address management using vendor based MAC address information in accordance with some embodiments.

FIG. 2 illustrates a functional diagram of an IP Address Management (IPAM) device for associating text strings with numeric numbers for IP address management using vendor based MAC address information in accordance with some embodiments. As shown, an IPAM system 202 includes a network naming module 204 (e.g., implemented as software executed on a processor of an appliance, a virtual appliance, or a computer system), which implements the various network naming techniques described herein (e.g., various techniques for associating text strings with numeric numbers for IP address management and various techniques for associating text strings with numeric numbers for IP address management using vendor based Media Access Control (MAC) address information). The network naming module 204 is in communication with a data store 206 (e.g., a database or other data storage techniques), which stores text strings (e.g., network names) in association with substrings of network address as described herein. The network naming module 204 is also in communication with a MAC lookup module 208 (e.g., implemented as software executed on a processor of an appliance, a virtual appliance, or a computer system), and the MAC lookup module 208 is in communication with a MAC registry 214 (e.g., for performing various techniques for associating text strings with numeric numbers for IP address management using vendor based Media Access Control (MAC) address information as described herein) via a network, such as the Internet as shown in and as similarly described above with respect to FIG. 1B. The network naming module 204 is also in communication with an Admin Connector 210, which is in communication with a WebUI 212 via a network, such as the Internet as shown in and as similarly described above with respect to FIG. 1A. As will now be apparent to one of ordinary skill in the art in view of the disclosed embodiments, the functional architecture as shown in FIG. 2 or other similar functional architectures can be used for providing management of IPv6 network numbers using vendor based MAC address information as described herein.

Figure 3:
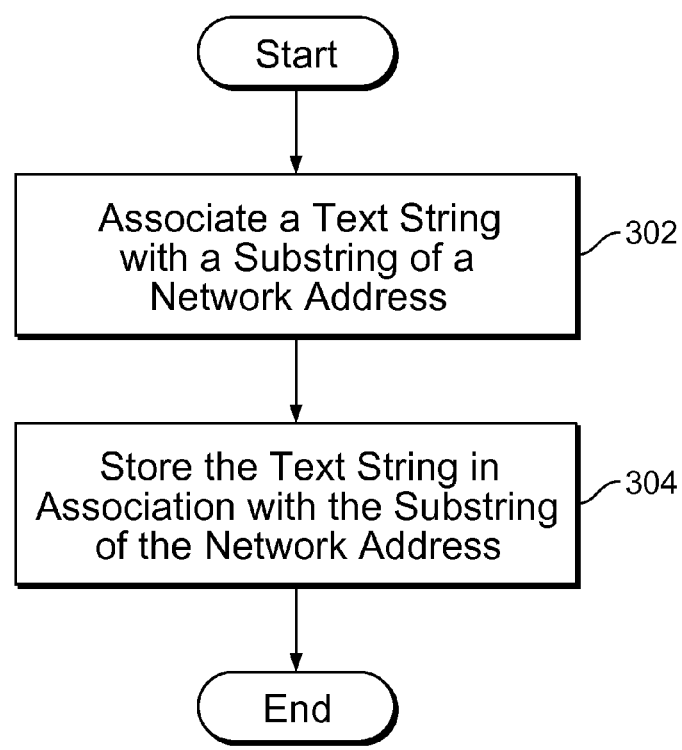
FIG. 3 illustrates a flow diagram for associating text strings with numeric numbers for IP address management in accordance with some embodiments.

FIG. 3 illustrates a flow diagram for associating text strings with numeric numbers for IP address management in accordance with some embodiments. In some embodiments, a process for an IPAM system for managing an IP address space for an enterprise network is shown in FIG. 3. At 302, associating a text string with a substring of a network address is performed. At 304, storing the text string in association with the substring of the network address in the IPAM system for managing the IP address space for the enterprise network is performed. In some embodiments, the network address is an Internet Protocol version 6 (IPv6) network address for a network. In some embodiments, the network address is an Internet Protocol version 6 (IPv6) network address for a host device. In some embodiments, the text string includes a network name for a global routing prefix of the network address for a network. In some embodiments, the text string indicates location or organizational information for a network. In some embodiments, the process further includes transmitting for presentation the text string substituted for the substring of the network address. In some embodiments, the process further includes displaying (e.g., in a GUI, such as WebUI 112/212) the text string substituted for the substring of the network address.

Figure 4:
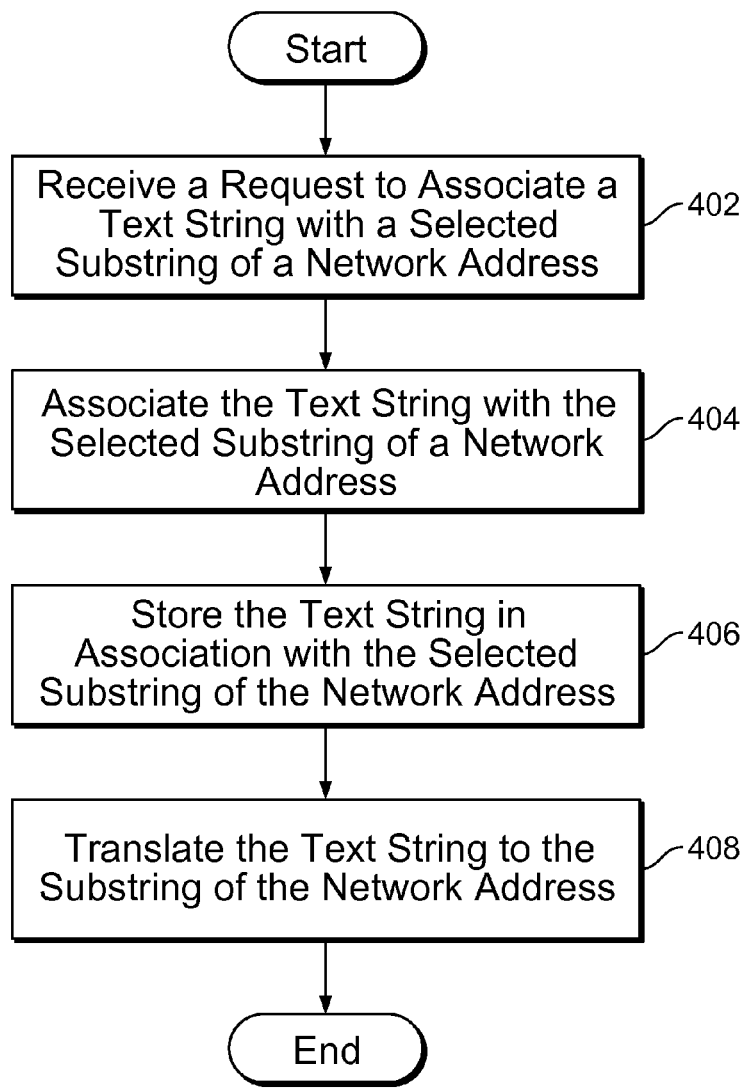
FIG. 4 illustrates another flow diagram for associating text strings with numeric numbers for IP address management in accordance with some embodiments.

FIG. 4 illustrates another flow diagram for associating text strings with numeric numbers for IP address management in accordance with some embodiments. In some embodiments, a process for an IPAM system for managing an IP address space for an enterprise network is shown in FIG. 4. At 402, a request is received to associate a text string with a selected substring of the network address, in which the selected substring of the network address corresponds to the substring of the network address. At 404, associating the text string with the selected substring of a network address is performed. At 406, storing the text string in association with the selected substring of the network address in the IPAM system for managing the IP address space for the enterprise network is performed. At 408, translating the text string to the substring of the network address (or vice versa) is performed (e.g., for display in a GUI, such as WebUI 112/212). In some embodiments, the process further includes mapping a set of network addresses for subnets of the enterprise network to a set of network names; and displaying in a graphical user interface the set of network addresses for subnets of the enterprise network mapped to the set of network names.

Figure 5:
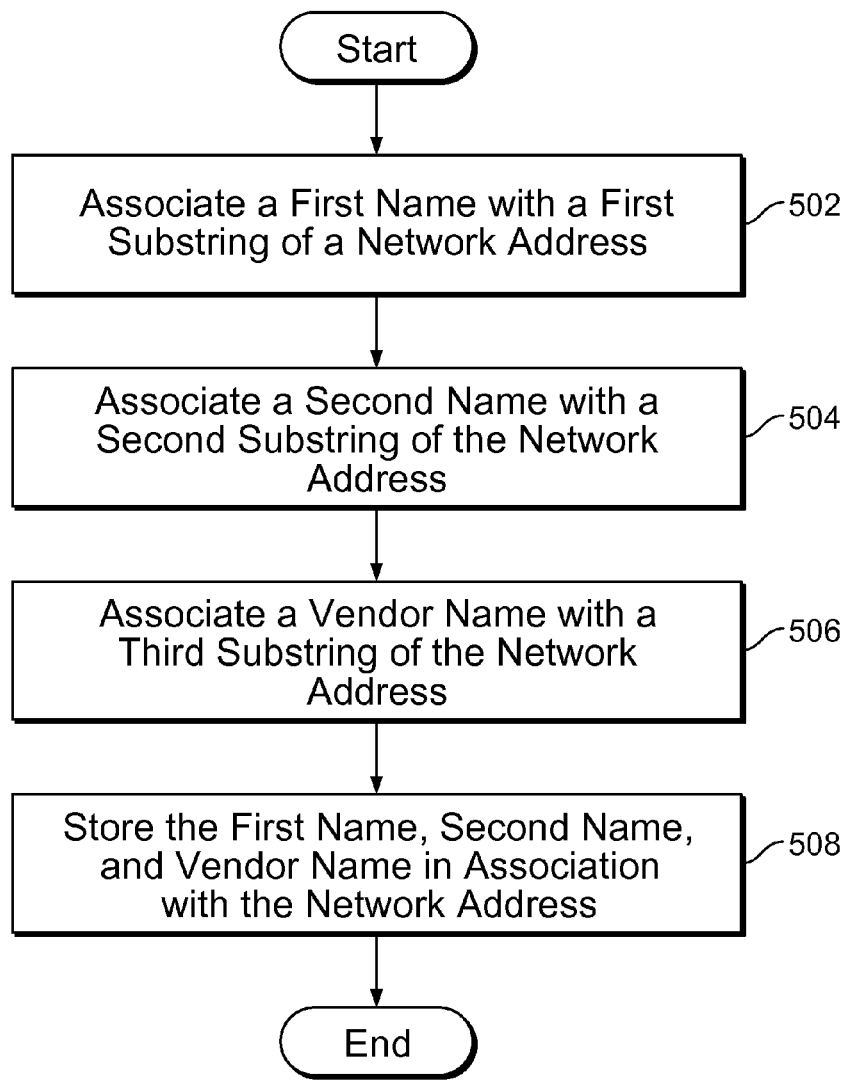
FIG. 5 illustrates a flow diagram for associating text strings with numeric numbers for IP address management using vendor based MAC address information in accordance with some embodiments.

FIG. 5 illustrates a flow diagram for associating text strings with numeric numbers for IP address management using vendor based MAC address information in accordance with some embodiments. In some embodiments, a process for an IPAM system for managing an IP address space using vendor based MAC address information for an enterprise network is shown in FIG. 5. At 502, associating a first name with a first substring of a network address of a host device is performed. At 504, associating a second name with a second substring of the network address of the host device is performed. At 506, associating a vendor name with a third substring of the network address of the host device, in which the vendor name is determined based on Media Access Control (MAC) address is performed. At 508, storing the first name, the second name, and the vendor name in association with the network address in the IPAM system for managing the IP address space for the enterprise network is performed.

Figure 6:
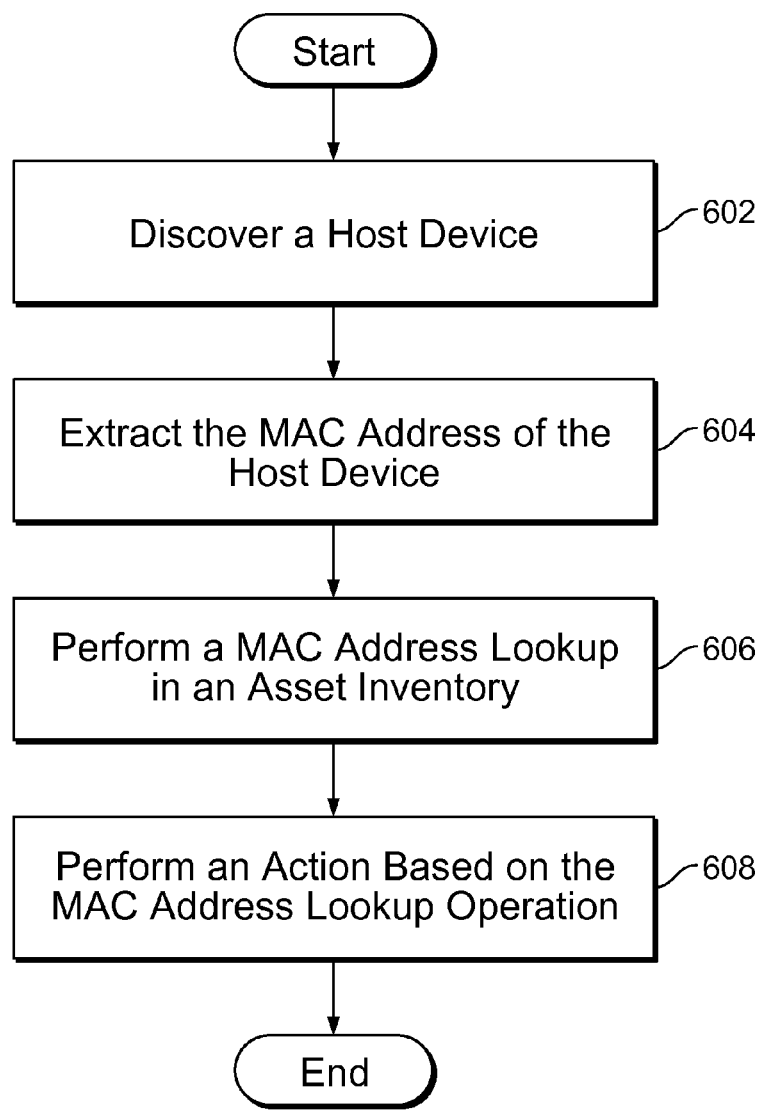
FIG. 6 illustrates another flow diagram for associating text strings with numeric numbers for IP address management using vendor based MAC address information in accordance with some embodiments.

FIG. 6 illustrates another flow diagram for associating text strings with numeric numbers for IP address management using vendor based MAC address information in accordance with some embodiments. At 602, a host device is discovered on an enterprise network. At 604, the MAC address of the host device is extracted. At 606, a MAC address lookup in an asset inventory (e.g., asset inventory 116) is performed. At 608, an action based on the MAC address lookup is performed. For example, if the host device is determined to be in the asset inventory, then no action is performed. If the host device is determined to not be in the asset inventory, then the host device can be quarantined or given limited or restricted access to the enterprise network (e.g., the host device can be isolated from the enterprise network automatically at a local switch or using various other network access control techniques).

Figure 7:
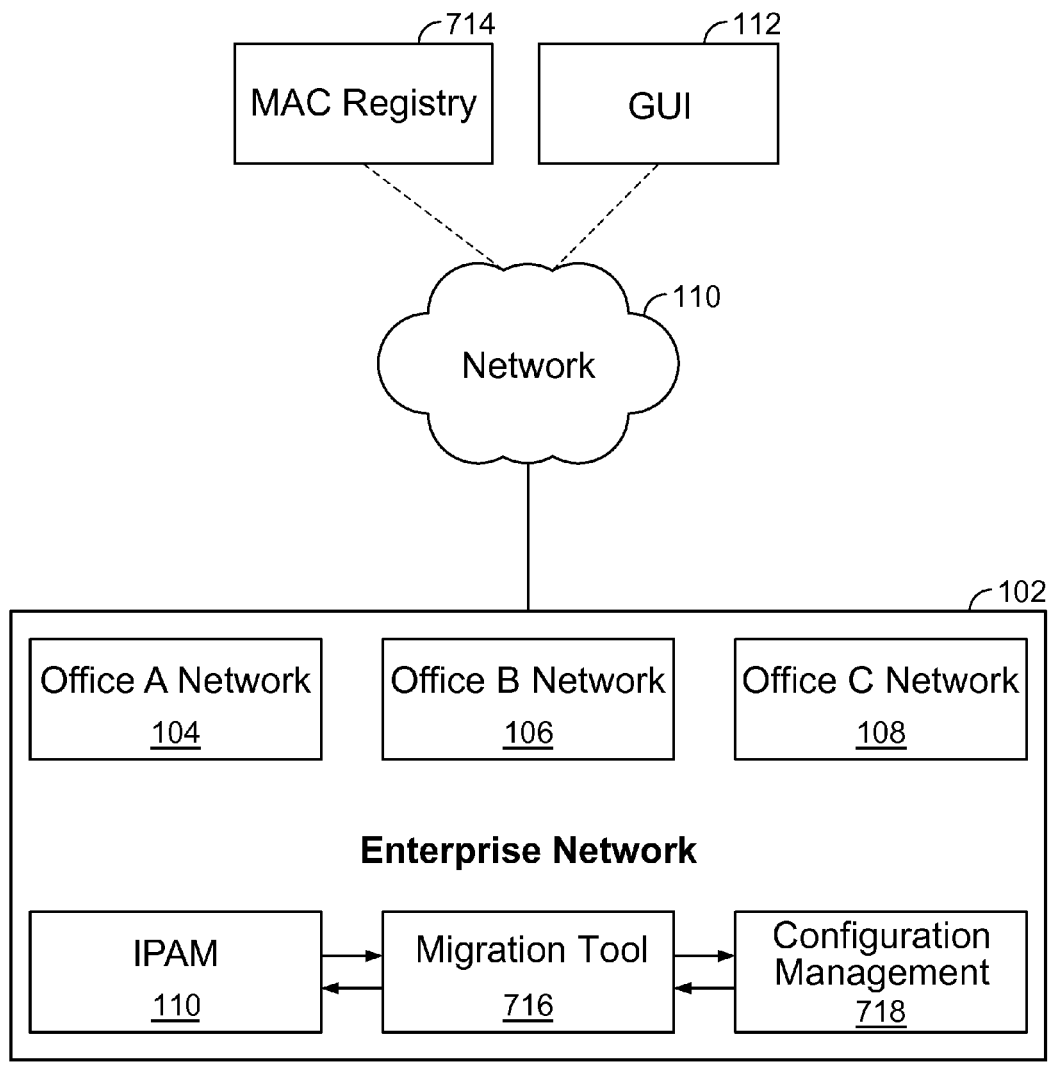
FIG. 7 illustrates a network architecture for graphically organizing networks by multiple criteria for IP address management network migration in accordance with some embodiments.

FIG. 7 illustrates a network architecture for graphically organizing networks by multiple criteria for IP address management network migration in accordance with some embodiments. As shown (and as similarly discussed above with respect to FIG. 1A), an enterprise network 102 includes various subnetworks for different offices, which as shown include Office A Network 104, Office B Network 106, and Office C Network 108 (e.g., which can be in different geographical locations). The enterprise network 102 also includes an Internet Protocol Address Management (IPAM) system 110 for managing an Internet Protocol (IP) address space for the enterprise network 102 of an enterprise (e.g., including managing the IP address space for the subnetworks 104, 106, and 108 and the various host devices on the enterprise network 102 including the subnetworks 104, 106, and 108). For example, various authorized users, such as authorized network administrators or network managers can access the IPAM system through a WebUI 112 (e.g., web based user interface, which provides a graphical user interface (GUI), and which can be accessed via various web browsers) via a network, such as the Internet 110 as shown.

As also shown, the enterprise network 102 also includes a migration tool 716 (e.g., a wizard or other functional module that can be implemented on the IPAM system 110 or another computing device) and a configuration management 718 (e.g., IP address management configuration information that can be stored in a data store or stored on the IPAM system 110). In some embodiments, the migration tool 716 implements the various techniques for graphically organizing networks by multiple criteria for IP address management network migration as described herein. In some embodiments, the network architecture as shown in FIG. 7, or other similar network architectures as will now be apparent to one of ordinary skill in the art in view of the disclosed embodiments, can be used for graphically organizing networks by multiple criteria for IP address management network migration as described herein.

As also shown, the migration tool 716 can also communicate with a IPv6 device registry 714 over the network (e.g., Internet) 110. In some embodiments, the various techniques described herein allow a network administrator to do an analysis of their network to examine the network and determine which network devices on the examined network will support IPv6. For example, publicly available data sources, such as the IPv6 device registry 714 can be used in order to analyze the devices on the examined network and determine which of the devices on the examined network are capable of supporting IPv6 and which of the devices on the examined network are not capable of supporting IPv6 (e.g., and such can be presented for output, such as in a report or graphical user interface (GUI) display or other output mechanism).

Figure 8:
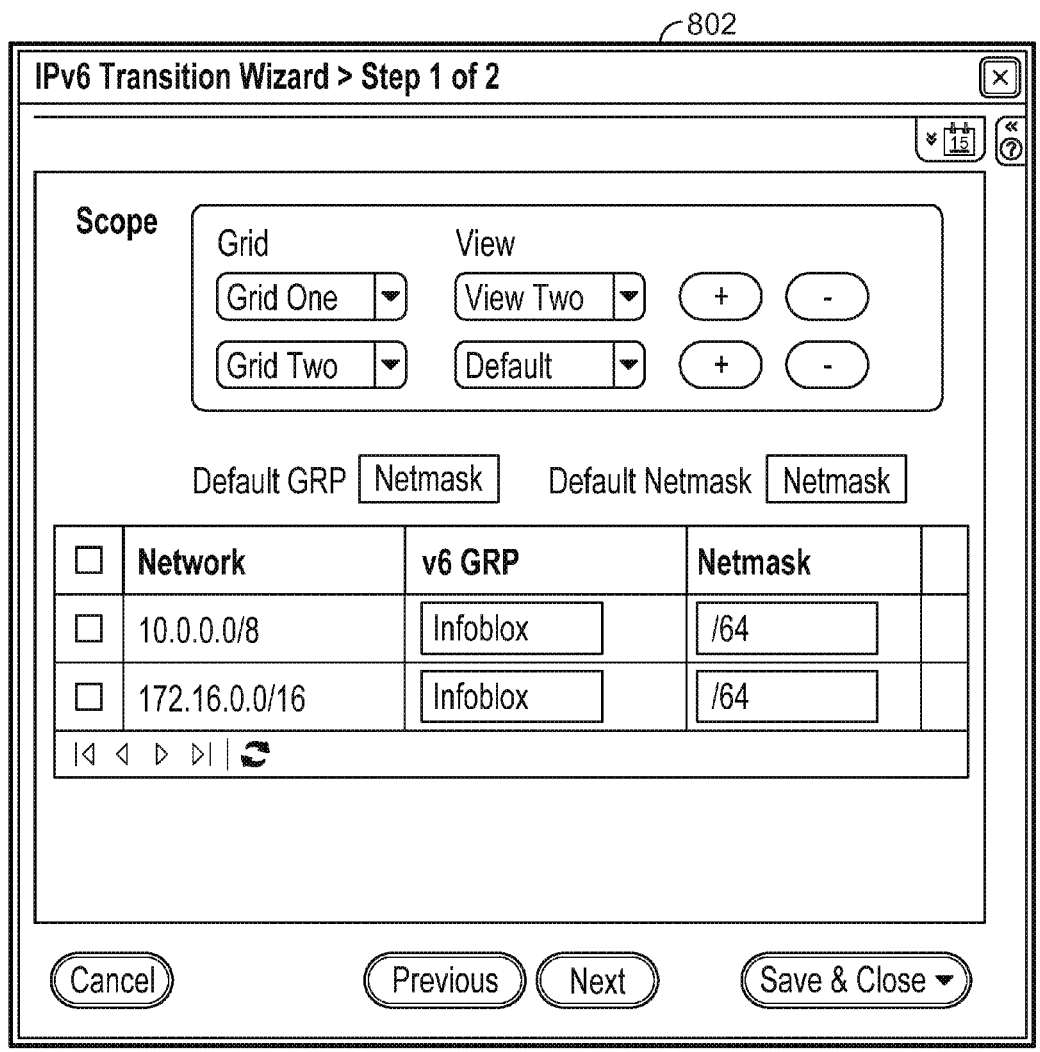
FIG. 8 illustrates a screen shot 802 of a graphical user interface (GUI) of an IPv6 transition wizard for graphically organizing networks by multiple criteria for IP address management network migration in accordance with some embodiments.

FIG. 8 illustrates a screen shot 802 of a graphical user interface (GUI) of an IPv6 transition wizard for graphically organizing networks by multiple criteria for IP address management network migration in accordance with some embodiments. In some embodiments, various techniques described herein facilitate an IPv4 to IPv6 migration that includes deploying the automatically generated new IPv6 networks. For example, a network administrator can specify which IPv4 networks should be transitioned to IPv6, such as shown in the IPv6 transition wizard screen shot 802 in which one or more of the displayed networks can be selected. As also shown, each network can be associated with an IPv6 Global Routing Prefix (v6 GRP), and the administrator can specify a default subnet size for the IPv6 networks (e.g., /64 or another default subnet size).

FIG. 9 illustrates another screen shot 902 of a graphical user interface (GUI) of an IPv6 transition wizard for graphically organizing networks by multiple criteria for IP address management network migration in accordance with some embodiments. In some embodiments, an IP address management (IPAM) system provides extensible attributes (e.g., metadata that is configurable by a network administrator) that allow network administrators to associate a text string (e.g., location or other information) with a subnet. After selecting the IPv4 networks, the user can then organize these IPv4 networks based on non-network criteria, such as location as shown in the IPv6 transition wizard screen shot 902 (e.g., or other attributes or based on a combination of selected attributes). Once the IPv6 networks are organized and grouped (e.g., based on extensible attributes, such as location as shown in the IPv6 transition wizard screen shot 902, in which the selected attribute is location for these subnets), the various techniques described herein can be performed to allocating and deploying the new IPv6 networks. In some embodiments, a network administrator can override the suggested IPv6 networks (e.g., for specific parts of the address space). For example, a discontiguous IPv4 address space for a given location can be migrated to a contiguous IPv6 address space using the techniques described herein by automatically generating suggested IPv6 subnets (e.g., summarizable IPv6 address blocks of size /64). Planning on the address space based on location information and providing a contiguous block of IPv6 address block for a given location enhances IP address management and IPv6 migration, and it also facilitates summarization, which generally improves router performance.

Figure 10:
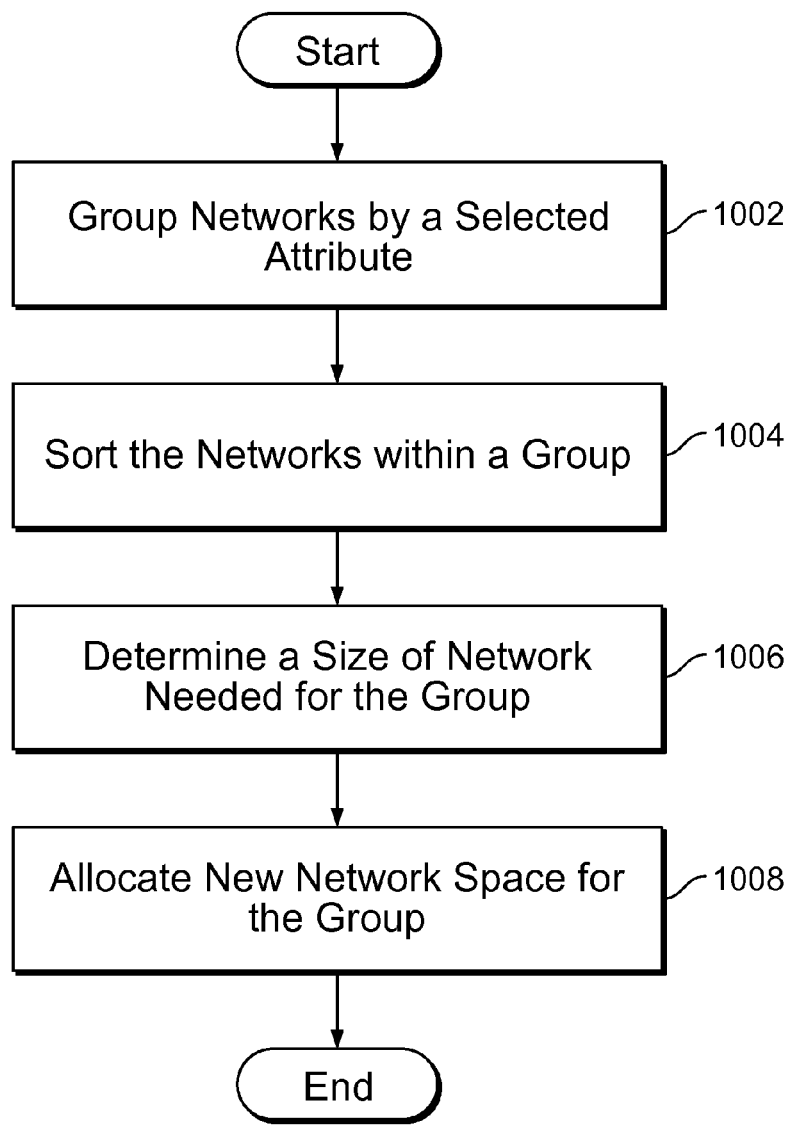
FIG. 10 illustrates a flow diagram for graphically organizing networks by multiple criteria for IP address management network migration in accordance with some embodiments.

FIG. 10 illustrates a flow diagram for graphically organizing networks by multiple criteria for IP address management network migration in accordance with some embodiments. In some embodiments, graphically organizing networks by multiple criteria for IP address management network migration includes providing an automatic IPv4 to IPv6 network mapping process. As shown, at 1002, grouping existing IPv4 networks by a selected attribute (e.g., location information or other attribute(s)) is performed. At 1004, sorting the networks within group (e.g., lowest to highest) is performed. At 1006, determining a size of network needed (e.g., based on a power of 2) is performed. At 1008, allocating IPv6 network space for the determined size of the network needed (e.g., ensuring that additional space is allocated for future growth). In some embodiments, the automatically generated suggested IPv6 network allocation for the IPv4 to IPv6 migration is presented to the network administrator. In some embodiments, the network administrator can accept or modify and then deploy the new IPv6 network(s). In some embodiments, the network administrator can save the suggested IPv6 network allocation for later action (e.g., review, edit, or deploy). In some embodiments, the suggested IPv6 network allocation can be deployed based on a selected subnet, group, and or for the entire suggested IPv6 network space.

As similarly discussed above, the IPv6 network allocations can be automatically generated based on generally accepted best practices, such as the following example best practices. Contiguous network address allocation (e.g., a contiguous network address allocation criteria), such as ensuring a contiguous network address allocation within a selected subnet index, is a generally accepted best practice. Standard network size (e.g., a standard network size criteria for allocating IPv6 network addressing) in which a generally accepted best practice is to make all non-point-to-point IPv6 networks a size of /64. Summarization (e.g., a summarization criteria for allocating IPv6 network addressing) in which a generally accepted best practice is to ensure that all networks in a specific part of the network should be addressable by a single summary network to simplify and optimize routing. Spacing (e.g., a spacing criteria for allocating IPv6 network addressing) in which a generally accepted best practice is to ensure that there should be gaps in the allocation of new networks to allow for future growth of the network. In particular, these gaps should generally be based on powers of 2 to allow for further summarization of networks (e.g., every second network (or fourth or eighth, etc.) should be allocated initially, thereby allowing future expansion to use these gaps).

In some embodiments, the IPv6 migration techniques described herein also allow for network administrators to use the network naming techniques also described herein with respect to FIGS. 1-6. For example, a network administrator can name their new IPv6 subnets during the IPv6 migration process.

Figure 11:
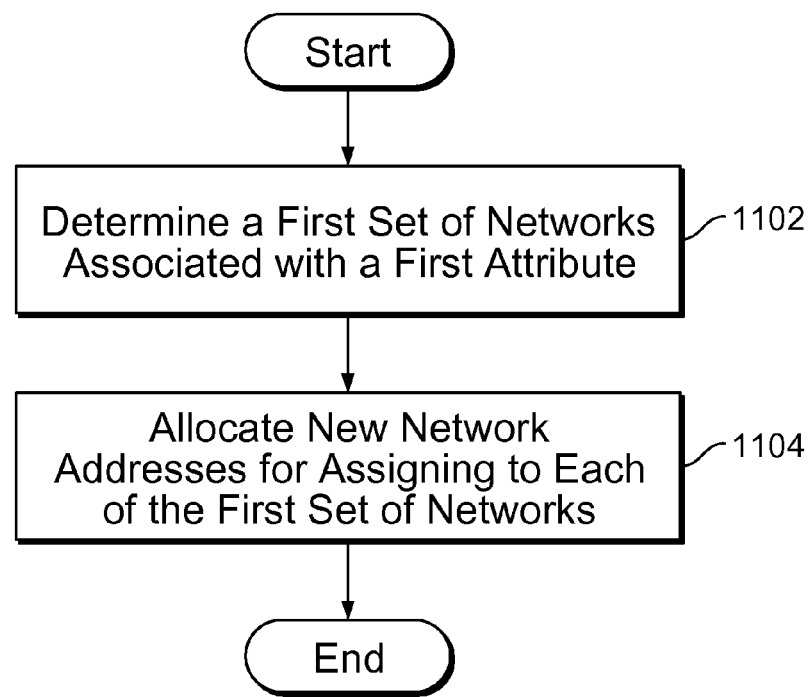
FIG. 11 illustrates another flow diagram for graphically organizing networks by multiple criteria for IP address management network migration in accordance with some embodiments.

FIG. 11 illustrates another flow diagram for graphically organizing networks by multiple criteria for IP address management network migration in accordance with some embodiments. As shown, at 1102, determining a first set of networks associated with a first attribute is performed. At 1104, allocating new network addresses for assigning to each of the first set of networks is performed, in which the new network addresses are allocated based on a contiguous network address allocation criteria. In some embodiments, the first set of networks are Internet Protocol version 4 (IPv4) networks, and in which the new network addresses allocated to each of the first set of networks are Internet Protocol version 6 (IPv6) network addresses. In some embodiments, the first set of networks is determined based on the first attribute and a second attribute. In some embodiments, the new network addresses are selected based on a contiguous network address allocation within a selected subnet index. In some embodiments, the first attribute includes an extensible attribute stored as metadata in association with the first set of networks in an Internet Protocol Address Management (IPAM) system for managing an Internet Protocol (IP) address space for the enterprise network. In some embodiments, the first attribute indicates location information for a network, and in which the new network addresses are allocated based on a contiguous network address allocation criteria and on or more additional criteria selected from a standard network size criteria, a summarization criteria, and a spacing criteria.

In some embodiments, the process further includes transmitting the allocated new network addresses for assigning to each of the first set of networks to an Internet Protocol Address Management (IPAM) system for managing an Internet Protocol (IP) address space for the enterprise network. In some embodiments, the process further includes receiving an override request for at least one of the new network addresses.

In some embodiments, the process further includes determining a first set of network devices on a first subnet of the enterprise network that are compatible with Internet Protocol version 6 (IPv6); determining a second set of network devices on a first subnet of the enterprise network that are not compatible with Internet Protocol version 6 (IPv6); and assigning each of the first set of network devices that are compatible with IPv6 a new network address within the first subnet of the enterprise network.

In some embodiments, the process further includes determining a new set of network addresses for assigning to each of the first set of networks based on a sequence that is alternating by a predetermined value to allow for additional network address growth for each of the first set of networks. In some embodiments, the process further includes receiving an input for a value for allocating additional address space to provide with automatic network address allocation for an Internet Protocol version 4 (IPv4) to Internet Protocol version 6 (IPv6) network addressing transition.

In some embodiments, the process further includes receiving a text string input for a subnet identifier address portion for one or more of the first set of networks assigned to a first subnet index of the enterprise network; and incrementing by a count for appending the count to the text string input for the subnet identifier for associating a network name to an allocated Internet Protocol version 6 (IPv6) network address that is automatically generated during an Internet Protocol version 4 (IPv4) to Internet Protocol version 6 (IPv6) network addressing transition using a migration tool.

In some embodiments, the process further includes performing a wizard for automatically transitioning from Internet Protocol version 4 (IPv4) network addressing to Internet Protocol version 6 (IPv6) network addressing, in which the determined new network addresses are automatically deployed to a plurality of network devices if approved by a network administrator.

In some embodiments, the process further includes mapping a set of new Internet Protocol version 6 (IPv6) network addresses for subnets of the enterprise network to a set of network names; and presenting output for display the set of new Internet Protocol version 6 (IPv6) network addresses for subnets of the enterprise network mapped to the set of network names, in which the output is displayed in a graphical user interface (GUI) in communication with an Internet Protocol Address Management (IPAM) system for managing an Internet Protocol (IP) address space for the enterprise network.

Figure 12:
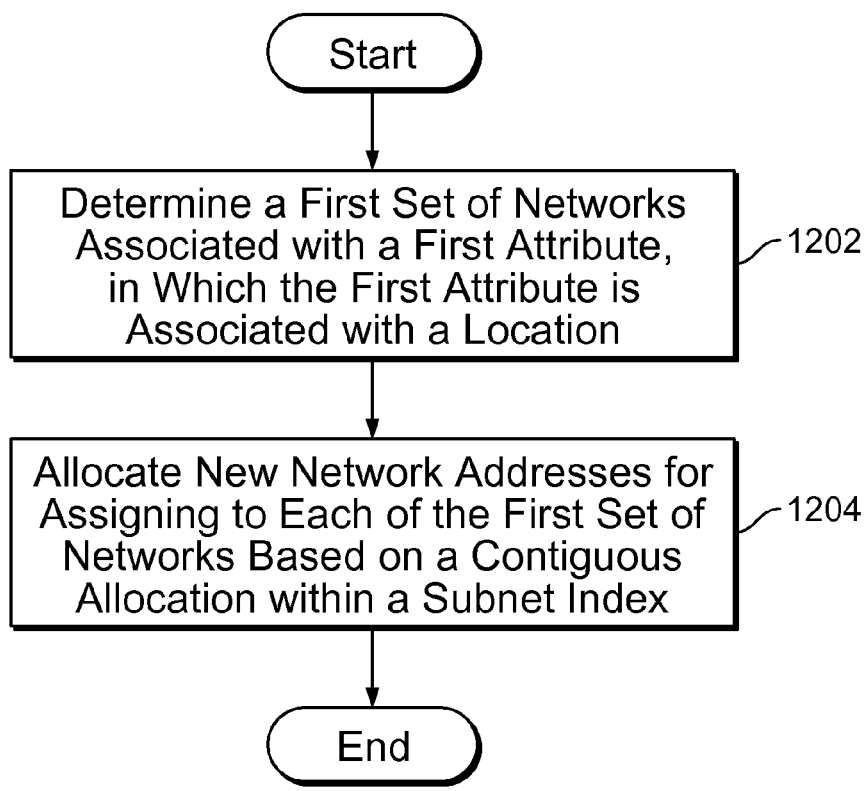
FIG. 12 illustrates another flow diagram for graphically organizing networks by multiple criteria for IP address management network migration in accordance with some embodiments.

FIG. 12 illustrates another flow diagram for graphically organizing networks by multiple criteria for IP address management network migration in accordance with some embodiments. As shown, at 1202, determining a first set of networks associated with a first attribute is performed, in which the first attribute is associated with location information. At 1204, allocating new network addresses for assigning to each of the first set of networks is performed, in which the new network addresses are selected based on a contiguous network address allocation within a selected subnet index, in which the first set of networks are Internet Protocol version 4 (IPv4) networks, and in which the new network addresses assigned to each of the first set of networks are Internet Protocol version 6 (IPv6) network addresses. In some embodiments, the process further includes determining one or more devices on a network of the enterprise; and determining which of the one or more devices on the network of the enterprise do not support Internet Protocol version 6 (IPv6) network addresses Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing an Internet Protocol (IP) address space for an enterprise network, comprising:
a processor configured to:
determine a first set of networks associated with a first attribute, the first set of networks being Internet Protocol version (IPv4) networks; and
allocate new network addresses for assigning to each of the first set of networks, wherein the new network addresses are allocated based on a contiguous network address allocation criteria, wherein the allocating of the new network addresses includes:
determine a size of a network including the new network addresses, the size of the network relating to a power of 2, and each new network address being on a same subnet;
determine a first set of network devices on a first subnet and a second subnet of the enterprise network that are compatible with Internet Protocol version 6 (IPv6), the first subnet being separate from the second subnet; and
assign the first set of network devices a new network address, the new network address being an IPv6 network address; and
a memory coupled to the processor and configured to provide the processor with instructions.

2. The system recited in claim 1, wherein the first set of networks is determined based on the first attribute and a second attribute.

3. The system recited in claim 1, wherein the new network addresses are selected based on a contiguous network address allocation within a selected subnet index.

4. The system recited in claim 1, wherein the first attribute includes an extensible attribute stored as metadata in association with the first set of networks in an Internet Protocol Address Management (IPAM) system for managing an Internet Protocol (IP) address space for the enterprise network.

5. The system recited in claim 1, wherein the first attribute indicates location information for a network, and wherein the new network addresses are allocated based on a contiguous network address allocation criteria and on or more additional criteria selected from a standard network size criteria, a summarization criteria, and a spacing criteria.

6. The system recited in claim 1, wherein the processor is further configured to:
transmit the allocated new network addresses for assigning to each of the first set of networks to an Internet Protocol Address Management (IPAM) system for managing an Internet Protocol (IP) address space for the enterprise network.

7. The system recited in claim 1, wherein the processor is further configured to:
receive an override request for at least one of the new network addresses.

8. The system recited in claim 1, wherein the processor is further configured to:
determine a new set of network addresses for assigning to each of the first set of networks based on a sequence that is alternating by a predetermined value to allow for additional network address growth for each of the first set of networks.

9. The system recited in claim 1, wherein the processor is further configured to:
receive an input for a value for allocating additional address space to provide with automatic network address allocation for an Internet Protocol version 4 (IPv4) to Internet Protocol version 6 (IPv6) network addressing transition.

10. The system recited in claim 1, wherein the processor is further configured to:
receive a text string input for a subnet identifier address portion for one or more of the first set of networks assigned to a first subnet index of the enterprise network; and
increment by a count for appending the count to the text string input for the subnet identifier for associating a network name to an allocated Internet Protocol version 6

(IPv6) network address that is automatically generated during an Internet Protocol version 4 (IPv4) to Internet Protocol version 6 (IPv6) network addressing transition using a migration tool.

11. The system recited in claim 1, wherein the processor is further configured to:
perform a wizard for automatically transitioning from Internet Protocol version 4 (IPv4) network addressing to Internet Protocol version 6 (IPv6) network addressing, wherein the determined new network addresses are automatically deployed to a plurality of network devices if approved by a network administrator.

12. The system recited in claim 1, wherein the processor is further configured to:
map a set of new Internet Protocol version 6 (IPv6) network addresses for subnets of the enterprise network to a set of network names; and
present output for display the set of new Internet Protocol version 6 (IPv6) network addresses for subnets of the enterprise network mapped to the set of network names, wherein the output is displayed in a graphical user interface (GUI) in communication with an Internet Protocol Address Management (IPAM) system for managing an Internet Protocol (IP) address space for the enterprise network.

13. A method for managing an Internet Protocol (IP) address space for an enterprise network, comprising:
determining, using a processor, a first set of networks associated with a first attribute, the first set of networks being Internet Protocol version (IPv4) networks; and
allocating, using the processor, new network addresses for assigning to each of the first set of networks, wherein the new network addresses are selected based on a contiguous network address allocation criteria, wherein the allocating of the new network addresses includes:
determining a size of a network including the new network addresses, the size of the network relating to a power of 2, and each new network address being on a same subnet;
determining a first set of network devices on a first subnet and a second subnet of the enterprise network that are compatible with Internet Protocol version 6 (IPv6), the first subnet being separate from the second subnet; and
assigning the first set of network devices a new network address, the new network address being an IPv6 network addresses.

14. A computer program product for managing an Internet Protocol (IP) address space for an enterprise network, the computer program product being embodied in a tangible non-transitory computer readable storage medium and comprising computer instructions to be executed by a computer for:
determining a first set of networks associated with a first attribute; attribute, the first set of networks being Internet Protocol version (IPv4) networks; and
allocating new network addresses for assigning to each of the first set of networks, wherein the new network addresses are selected based on a contiguous network address allocation criteria, wherein the allocating of the new network addresses includes:
determining a size of a network including the new network addresses, the size of the network relating to a power of 2, and each new network address being on a same subnet;
determining a first set of network devices on a first subnet and a second subnet of the enterprise network that are compatible with Internet Protocol version 6 (IPv6), the first subnet being separate from the second subnet; and
assigning the first set of network devices a new network address, the new network address being an IPv6 network addresses.

15. An Internet Protocol Address Management (IPAM) system for managing an Internet Protocol (IP) address space of an enterprise network, comprising:
a processor configured to:
determine a first set of networks associated with a first attribute, the first set of networks being Internet Protocol version (IPv4) networks, wherein the first attribute is associated with location information; and
allocate new network addresses for assigning to each of the first set of networks, wherein the new network addresses are selected based on a contiguous network address allocation within a selected subnet index, wherein the first set of networks are Internet Protocol version 4 (IPv4) networks, wherein the new network addresses assigned to each of the first set of networks are Internet Protocol version 6 (IPv6) network addresses, and wherein the allocating of the new network addresses includes:
determine a size of a network including the new network addresses, the size of the network relating to a power of 2, and each new network address being on a same subnet;
determine a first set of network devices on a first subnet and a second subnet of the enterprise network that are compatible with Internet Protocol version 6 (IPv6), the first subnet being separate from the second subnet; and
assign the first set of network devices a new network address, the new network address being an IPv6 network address; and
a memory coupled to the processor and configured to provide the processor with instructions.

16. The system recited in claim 15, wherein the processor is further configured to:
determine one or more devices on a network of the enterprise; and
determine which of the one or more devices on the network of the enterprise do not support Internet Protocol version 6 (IPv6) network addresses.

* * * * *